United States Patent [19]

Ito et al.

[11] Patent Number: 4,818,457

[45] Date of Patent: Apr. 4, 1989

[54] METHOD OF MAKING MOLD USED IN SLIP CASTING PROCESS

[75] Inventors: Haruyuki Ito; Akio Matsumoto, both of Kitakyushu, Japan

[73] Assignee: Toto Ltd., Kitakyushu, Japan

[21] Appl. No.: 77,294

[22] Filed: Jul. 24, 1987

[30] Foreign Application Priority Data

Jul. 26, 1986 [JP] Japan ............................... 61-176372

[51] Int. Cl.[4] ...................... B29C 33/38; B29C 39/10; B29C 39/12; B29C 67/12

[52] U.S. Cl. .................................... 264/130; 264/133; 264/135; 264/219; 264/225; 264/250; 264/261; 264/264; 264/265; 264/275; 264/300; 249/113; 249/134; 249/141

[58] Field of Search .................... 264/86, 87, 129, 130, 264/133, 134, 135, 219, 220, 225, 226, 227, 221, 246, 247, 250, 251, 264, 271.1, 275, 278, 299, 300, 304, 307, 313, 317, DIG. 43, DIG. 63, DIG. 64, DIG. 44, 265, 261; 249/58, 62, 113, 114, 115, 134, 135, 141, 160, 142; 425/84, 85, 86, 437, 812, DIG. 102, DIG. 33

[56] References Cited

U.S. PATENT DOCUMENTS

| | | | |
|---|---|---|---|
| 2,584,109 | 2/1952 | Blackburn | 264/86 |
| 2,964,822 | 12/1960 | Tomkins | 264/86 |
| 3,156,751 | 11/1964 | Valdes | 264/87 |
| 3,243,860 | 4/1966 | Whittaker et al. | 25/129 |
| 3,500,444 | 3/1970 | Hesse | 264/86 |
| 3,641,229 | 2/1972 | Lawrence | 264/87 |
| 3,955,266 | 5/1976 | Hanami | 264/219 |
| 3,993,727 | 11/1976 | Skriletz | 264/225 |
| 4,100,853 | 7/1978 | Clancy | 264/41 |
| 4,413,966 | 11/1983 | Mills | 425/84 |
| 4,528,152 | 7/1985 | Aoyama | 264/87 |
| 4,591,472 | 5/1986 | Gerster | 264/87 |

FOREIGN PATENT DOCUMENTS

| | | | |
|---|---|---|---|
| 0211653 | 2/1987 | European Pat. Off. | 264/87 |
| 5817811 | 4/1963 | Japan . | |
| 56-14451 | 4/1981 | Japan . | |
| 58-208005 | 12/1983 | Japan . | |
| 60-8010 | 1/1985 | Japan . | |
| 1029512 | 2/1986 | Japan | 264/219 |
| 1295055 | 11/1972 | United Kingdom . | |

*Primary Examiner*—James Lowe
*Assistant Examiner*—Jeremiah F. Durkin, II
*Attorney, Agent, or Firm*—Fleit, Jacobson, Cohn & Price

[57] ABSTRACT

A method of making a mold used in a pressure slip casting process, including the steps of: preparing at least two porous bodies each defining a filter layer having a plurality of channels formed therein for allowing water and air to flow therethrough; placing a reinforcing iron frame and one of the porous bodies on a bottom board with a parting agent applied to its surface; applying a sealing resin to the surface of the other porous body opposite to a molding surface thereof and to a portion of the surface of the bottom board between the box and the porous body; filling up the space between one of the porous bodies and the reinforcing iron frame with a filler; and preparing a second part of the pressure mold. This second part preparing step includes the sub-steps of: turning the first part upside down together with the one porous body and the reinforcing iron frame to direct its parting face upward and applying a parting agent to the parting face; overlaying the other of the porous bodies on the one porous body; overlaying a second reinforcing iron frame on the first reinforcing iron frame; applying an adhesive to the sealing resin and the inner side of the overlaid second reinforcing iron frame after the sealing resin has cured; filling up the space between the overlaid second iron frame and the other porous body with filler; and parting the second part from the first part after the filler has cured.

7 Claims, 4 Drawing Sheets

METHOD OF MAKING MOLD USED IN SLIP CASTING PROCESS

BACKGROUND OF THE INVENTION

1. Field of the Invention

The present invention relates to a method of making a mold used to form ceramic articles by a pressure slip casting process.

2. Description of the Prior Art

A non-pressurized slip casting process is characterized by the use of a gypsum mold and has been adopted for use together with a lathe molding process and a dry press molding process. Most ceramic articles having especially large size and complex shape have been manufactured by the non-pressurized slip casting process. However, this process has a fatal defect obstructing the improvement in productivity. In the non-pressurized slip casting process, the slip cast into the gypsum mold has its water content absorbed into the mold by the mold's capillary action so that the casting rate of the slip cannot be improved drastically. When the gypsum mold is saturated with the water, its capillary action is so weakened that the mold has to be dried for a long time after every one or two uses. In order to solve those defects, a pressure casting process has recently been developed, and a variety of molds used in that process and a method of making the molds have been proposed.

One part of the molds of the prior art is formed by filling up a reinforcing pressure-resisting container or iron box with slurry or powder (e.g., a mixture of an epoxy resin and sand) to form a porous layer.

A plurality of parts thus formed are joined to form a mold cavity, and slip is introduced under a pressure of several to 30 $Kg/cm^2$ or more into that mold cavity. This makes it necessary to clamp the mold parts firmly so that the mold can stand the pressure of the slip applied to the molding surfaces. In the mold having the structure described above, the clamping pressure is borne by the porous layer having low strength and modulus of elasticity. This also makes it necessary to make the porous layer remarkably thick. This excessive thickness invites other defects: that the compression strain of the porous layer resulting from the pressure of the slip at the pressure casting step is increased to make it liable to crack the molding surfaces of the porous layer; and that a product is bitten by the porous layers at the return of the compression strain when it is to be removed, thus making the parting itself difficult.

On the other hand, curing of the porous layer during its formation results in large shrinkage or deformation of the mold to adversely affect the accuracy of the parting face. With the accuracy of the parting face being insufficient, there arises another defect that the slip cast into the mold under high pressure will spurt or, otherwise, will be extruded from the parting face during the casting step to leave large fins.

Passages are provided in the mold for draining the water through the porous layer at the casting step and for blowing the water and air from the molding surface of the mold through the porous layer when the product is to be parted. If the mold used in the pressure slip casting process is composed of upper and lower parts, the product cannot be parted simultaneously from the upper and lower parts. Therefore, it is a common practice to part the product from one part by supplying compressed air to the part through the passages while attracting the product to the other part by evacuating the other part through the passages and then to part the product from the other part by releasing the evacuation and supplying compressed air to the other part. The passages have to be so constructed as to allow the water and air to be injected and blown uniformly from the molding surface of the mold while the product is being removed. Otherwise, the product will possibly be difficult to be released from the mold which will partially lead to inferior quality. The mold of the prior art takes no consideration in that the thickness of the porous layer is made uniform and small all over the molding surface so that the water and air may be uniformiy injected from the molding surface.

SUMMARY OF THE INVENTION

It is, therefore, an object of the present invention to provide a method of making a mold which allows a cast product to release from the mold without any difficulty, prevents any slip from leaking or being extruded at the casting step, makes the porous layer reluctant to be cracked, and facilitates forming the mold.

According to a major feature of the present invention, there is provided a method of making a mold used in a pressure slip casting process, which comprises the steps of: preparing at least two porous bodies each defining a filter layer having a plurality of channels formed therein for allowing water and air to flow therethrough: placing a reinforcing iron frame and one of said porous bodies on a bottom board with a parting agent applied to its surface; applying a sealing resin to the surface of said one porous body opposite to a molding surface thereof and to a portion of the surface of the bottom board between said iron frame and said porous body providing a parting face; applying an adhesive to the sealing resin on said opposite surface and on said parting face and to the inner surface of said reinforcing iron frame after said sealing resin has cured filling up the space between one of said porous bodies and said reinforcing iron frame with a filler to form a first part of said mold; turning said first part upside down together with said one porous body and said reinforcing iron frame to direct its parting face upward and applying a parting agent to said parting face; overlaying the other of said porous bodies on said one porous body; overlaying a second reinforcing iron frame applying a sealing resin to the surface of said other porous body opposite to a molding surface thereof and to the parting face of said first part on the first reinforcing iron frame; applying an adhesive to the sealing resin and the inner side of the overlaid second reinforcing iron frame after said sealing resin has cured; filling up the space between said overlaid second iron frame and said other porous body with a filler to prepare a second part of said pressure mold; and parting said second part from said first part after said filler has cured.

According to another feature of the present invention, in the mold making method, said first part preparing step includes the sub-steps of: applying a parting agent to the surface of said bottom board and overlaying said one porous body and the first part reinforcing iron frame on said bottom board; applying a sealing resin to the surface of said one porous body opposite to a molding surface thereof; applying a sealing resin to the surface portion of said bottom board providing a parting face; applying an adhesive to the sealing resin on said opposite surface and on said parting face and to the inner side of said first reinforcing iron frame after said sealing resin has cured; filling up the space between said first reinforcing iron frame and said one porous body with a filler; and parting said first part from said bottom board after said filler has cured.

Thus, according to the method of the present invention, by making use of the parting face of one part prepared in advance on the bottom board, the other part is prepared on the one part so that the matchability of the parting face can always be retained.

BRIEF DESCRIPTION OF THE DRAWINGS

Other objects, features and advantages of the present invention will become apparent from the following description taken with reference to the accompanying drawings, in which.

DESCRIPTION OF THE PREFERRED EMBODIMENT

One embodiment of the present invention will be described in detail in the following with reference to the accompanying drawings.

Figure 1:
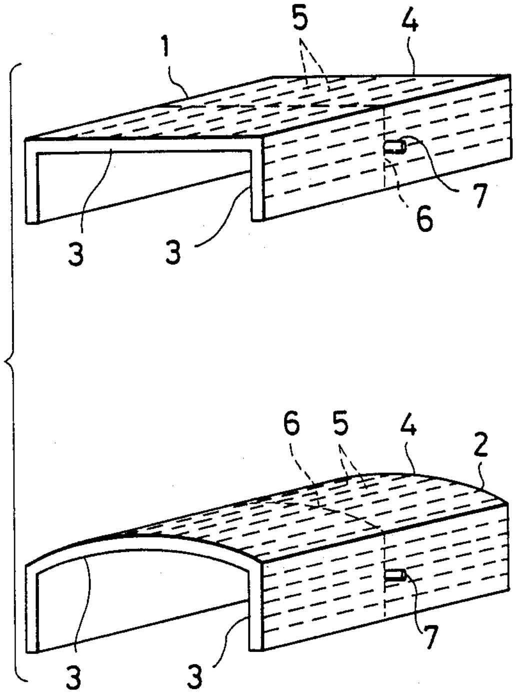
FIG. 1 is a perspective view showing porous bodies for upper and lower parts of a mold.

FIG. 1 shows two porous bodies to be used in making a mold according to the present invention. For simplicity of description, the present embodiment is exemplified by a porous body 1 for an upper mold part and a porous body 2 for a lower mold part. These porous bodies 1 and 2 are prepared in advance. Each of the porous bodies 1 and 2 is formed with a molding surface 3 and an outer surface 4 opposite to the former. A plurality of channels 5 are formed in the porous body 1 or 2 at a predetermined pitch and extend parallel to the molding surface 3. The channels 5 may be formed in the outer surface of the porous body 1 or 2. A trunk channel 6 is also formed in the porous body 1 or 2 to intersect the channels 5 and provide communications at the intersections. A communication port 7 is further formed on the porous body to provide communications between the channels 5 and 6 and the outside of the mold.

Figure 2:
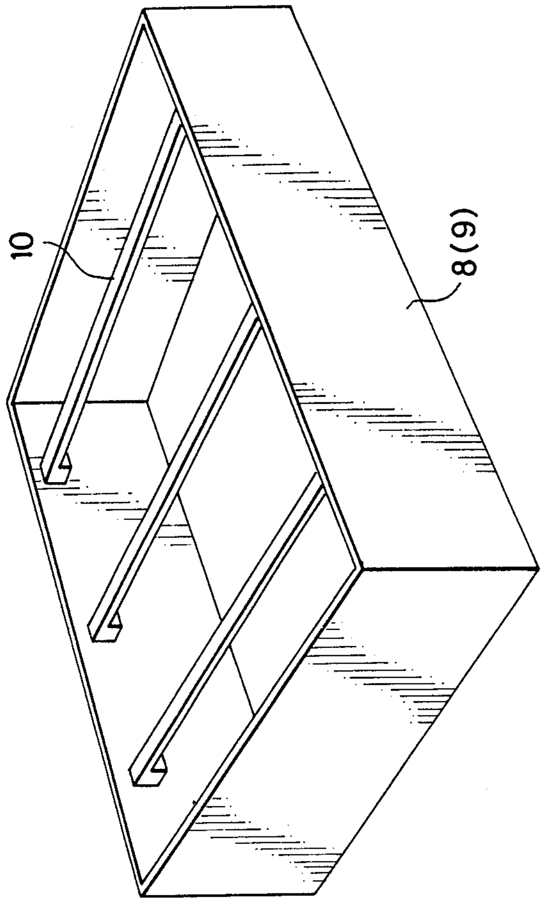
FIG. 2 is a perspective view of a reinforcing iron frame.

As shown in FIG. 2, a reinforcing iron frame 8 and a reinforcing iron frame 9 having their open bottom and top ends are used to make the mold of the present invention. These reinforcing iron frames 8 and 9 are reinforced by a plurality of reinforcing beams 10.

Figure 3:
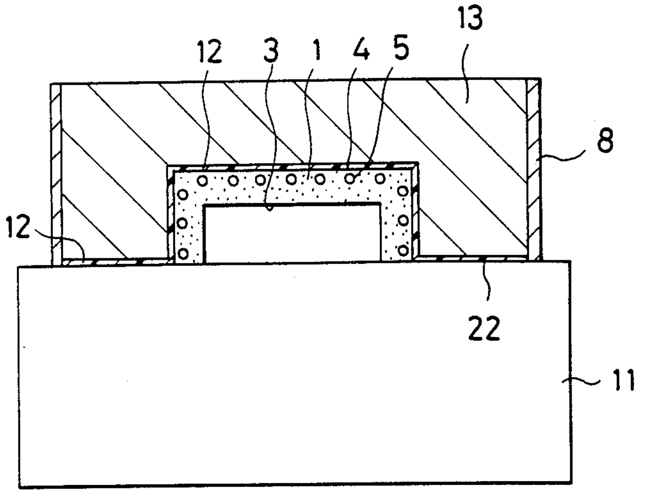
FIG. 3 shows in section the steps of making the upper part of the mold.

When the mold is to be made, as shown in FIG. 3, the porous body 1 and the reinforcing iron frame 8 are first placed in position on a bottom board 11, to the surface of which is applied a parting agent in advance. At this time, a space is left between the porous body 1 and the reinforcing iron frame 8. A pipe is connected to the communication port 7 of the porous body 1, and an aeration pipe for blowing compressed air into the mold cavity is connected to the porous body 1. Next, a sealing resin 12 is applied to the surface of the porous body 1 opposite to the molding surface and to the surface portion of the bottom board 11 for providing the parting face. After the resin has cured, an adhesive is applied to not only the resin 12 on the surface of the porous body 1 opposite to the molding surface and the cured resin 12 on the board surface but also the inner surface of the reinforcing iron frame 8. Then, the space between the reinforcing iron frame 8 and the porous body 1 is filled with a filler 13 up to the top side of the iron frame 8 to completely enclose the forming porous body 1, thereby providing an upper mold part 14. After the filler 13 has cured, the upper part 14 is removed from the bottom board 11.

Figure 4:
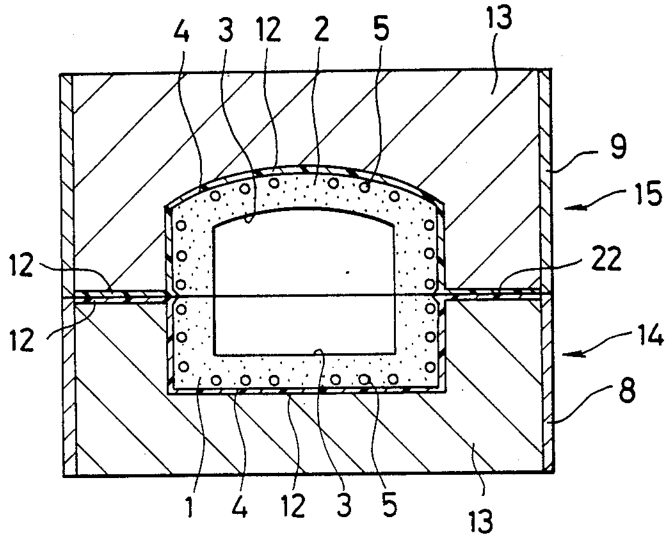
FIG. 4 shows in section the steps of preparing the bottom part of the mold.

A lower mold part 15 is then made in the following manner. The mold part 14 thus made is turned upside down to face the parting face of the sealing resin 12 upward. A parting agent is applied to this parting face. Then, as shown in FIG. 4, the porous body 2 is placed on the porous body 1, and the reinforcing iron frame 9 is framed over the iron frame 8. A pipe is connected to the communication port 7 for the channels, and a slip feeding pipe is connected to the porous body 2. Then, the sealing resin 12 is applied to the surface of the porous body 2 opposite to the molding surface 3 and further to the parting face of the mold part 14. An adhesive is applied to the sealing resin 12 on the surface of the porous body 2 and the parting face and to the inner surface of the iron frame 9 after the sealing resin has cured. Then, the space between the reinforcing iron frame 9 and the porous body 2 is filled up with the filler 13. After this filler 13 has cured, the mold part 15 can be easily removed from the mold part 14 through the parting agent applied to the parting face 22.

The sealing resin which is applied to both the parting face and the opposite surfaces of the porous bodies is preferred to have a flexibility after it has cured, and may be exemplified by the mixture of epoxy resin and a curing agent of polyamide. If this resin layer is excessively thick, its dimensional accuracy is degraded due to shrinkage during the curing step, and it is highly deformed due to the mold clamping pressure at the parting face of the porous bodies so that an overload is imposed upon the parting face. Hence, the resin layer should not be excessively thick and may be 10 mm or less, preferably 5 mm or less. The filler may be most preferably exemplified by cement, concrete or mortar because it has a little shrinkage, even after it has cured, and can be cast and has a high compression strength against the clamping pressure. In this case, the adhesive may preferably be a mixture containing an epoxy resin as a chief component and any combination of curing agents of polyamide, thiol and modified polyamide.

Figure 5:
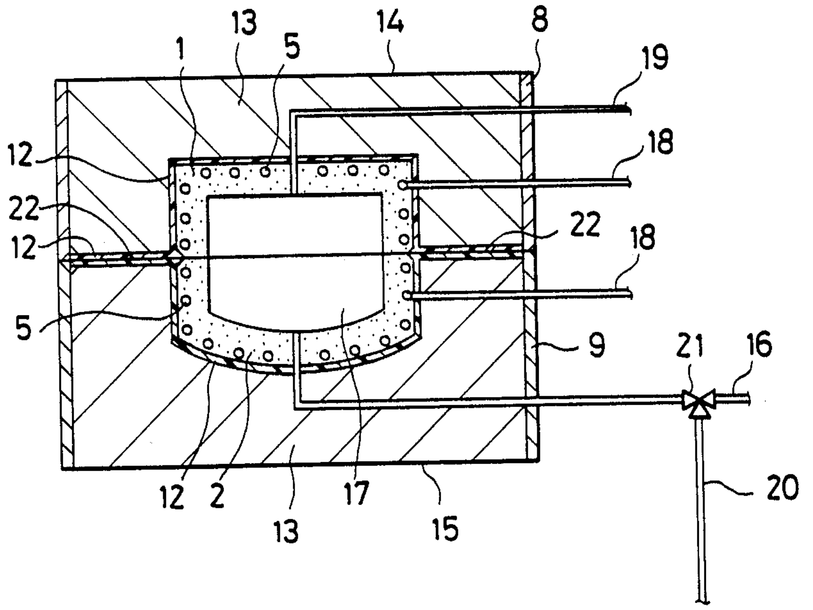
FIG. 5 shows in section the state of the mold made according to the present invention, in which the mold parts are jointed.

FIG. 5 shows in section the state in which the upper and lower parts 14 and 15 thus made are jointed. In FIG. 5, reference numeral 16 denotes a slip feeding pipe for introducing slip under high pressure into a mold cavity 17 which is defined by the porous bodies 1 and 2. Denoted at numeral 18 are communication pipes for providing communications between the channels 5 formed in the porous bodies 1 and 2 and the outside of the mold so that they are used to drain the water in the slip to the outside through the porous bodies and the channels or to supply compressed air to blow out the water or air from the molding surfaces. Denoted at numeral 19 is an aeration pipe for supplying the compressed air into the mold cavity to drain the slip and reduce the water content of the cast article. Denoted at numeral 20 is a slip draining pipe which is connected to the slip feeding pipe 16 through a three-way cock. As seen from FIG. 5, the sealing resin 12 is layered between the porous bodies 1 and 2 and the filler 13 to prevent the water and air from leaking out from the porous bodies.

Moreover, the mold has its parting face 22 covered with the layers of the sealing resin 12, which come into close contact with each other, when the mold is clamped, to completely prevent the slip from being extruded. The clamping pressure is borne by the wide parting face which is formed by the filler 13.

The description thus far made is directed to a process for manufacturing the mold composed of two parts. However, a mold having three or more parts can be manufactured in a similar manner without departing from the concept of the present invention. In case the mold is composed of upper, lower and side parts, for example, the iron frames for reinforcing the top and bottom blocks are formed to have a substantially C-shaped section, and the side block is used to provide the parting face with the upper and lower ones. The upper and lower parts thus prepared are positioned upright, and the side part is made on the top parting face.

According to the present invention, the porous bodies prepared in advance are fixed in their reinforcing iron frames by means of the filter, and the clamping pressure is borne by the filler providing the parting face so that the porous bodies can be made thinner than before. The parting face is formed by filling up the reinforcing iron frames once on the bottom board and then on the mold part with the filler so that it can have an excellent matchability. Moreover, the sealing resin layers covering the parting face can prevent the slip from being extruded.

What is claimed is:

1. A method of making a mold used in a pressure slip casting process, said method comprising the steps of:

preparing at least two porous bodies, each defining a filter layer having a plurality of channels formed therein for allowing water and air to flow therethrough;

placing a first reinforcing iron frame and one of said at least two porous bodies on a bottom board with a parting agent applied to a surface of said bottom board;

applying a sealing resin to an outermost surface of said one porous body opposite to a molding surface thereof and to a portion of said surface of said bottom board between said first reinforcing iron frame and said one porous body to provide a parting face;

applying an adhesive to said sealing resin on said outermost surface and on said parting face and to an inner surface of said first reinforcing iron frame after said sealing resin has cured;

filling a space between said one porous body and said first reinforcing iron frame with a filler to form a first part of said mold; and preparing a second part of said mold, said second part preparing step including the sub-steps of:

turning said first part upside down together with said one porous body and said first reinforcing iron frame to direct said parting face upward and applying a parting agent to said parting face;

overlaying the other of said at least two porous bodies on said one porous body;

overlaying a second reinforcing iron frame on said first reinforcing iron frame;

applying a sealing resin to an outermost surface of said other porous body opposite to a molding surface thereof and to said parting face of said first part;

applying an adhesive to said sealing resin and an inner side of said second reinforcing iron frame after said sealing resin has cured;

filling a space between said second reinforcing iron frame and said other porous body with a filler; and parting said second part from said first part after said filler has cured.

2. A mold making method according to claim 1, wherein said sealing resin is flexible even after it has cured.

3. A mold making method according to claim 2, wherein said sealing resin is the mixture of epoxy resin and a curing agent of polyamide.

4. A mold making method according to claim 1, wherein said sealing resin has a thickness of 10 mm or less, preferably 5 mm or less.

5. A mold making method according to claim 1, wherein said filler shrinks, even after it has cured, and is capable of being cast but having a high compression strength against the clamping pressure.

6. A mold making method according to claim 5, wherein said filler is selected from the group consisting of cement, concrete and mortar.

7. A mold making method according to claim 1, wherein said adhesive is a mixture containing an epoxy resin as a chief component and a curing agent selected from the group consisting of polyamide and thiol.

* * * * *